United States Patent
Hefner et al.

(10) Patent No.: US 10,618,627 B2
(45) Date of Patent: Apr. 14, 2020

(54) RUDDER TWIST LOCK METHOD AND APPARATUS

(71) Applicant: Bell Helicopter Textron Inc., Fort Worth, TX (US)

(72) Inventors: Levi Charles Hefner, Arlington, TX (US); Danielle Lynn Moore, Fort Worth, TX (US); Dakota Charles Easley, Hurst, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 318 days.

(21) Appl. No.: 15/895,192

(22) Filed: Feb. 13, 2018

(65) Prior Publication Data

US 2019/0248469 A1  Aug. 15, 2019

(51) Int. Cl.
*B64C 9/02* (2006.01)
*B64C 5/02* (2006.01)
*B64C 39/02* (2006.01)
*B64C 29/02* (2006.01)

(52) U.S. Cl.
CPC ............ *B64C 9/02* (2013.01); *B64C 5/02* (2013.01); *B64C 29/02* (2013.01); *B64C 39/024* (2013.01); *B64C 2201/021* (2013.01); *B64C 2201/024* (2013.01); *B64C 2201/102* (2013.01); *B64C 2201/108* (2013.01)

(58) Field of Classification Search
CPC .... B64C 9/02; B64C 5/06; B64C 1/26; B64C 5/02; B64C 39/024; B64C 2201/021; B64C 2201/102
USPC ................................. 244/87, 88, 2
See application file for complete search history.

(56) References Cited

U.S. PATENT DOCUMENTS

| | | | | |
|---|---|---|---|---|
| 3,004,645 A * | 10/1961 | Moul, Jr. | ........... | B64C 1/26 244/131 |
| 3,093,075 A * | 6/1963 | Garrett | ........... | F42B 10/04 244/3.24 |
| 3,228,335 A * | 1/1966 | Thompson | ........... | B64C 1/26 244/3.24 |
| 3,648,953 A * | 3/1972 | Polk, Jr. | ........... | F42B 10/06 244/3.24 |
| 4,535,958 A * | 8/1985 | Hutchison | ........... | B64C 3/18 244/123.8 |
| 5,064,142 A * | 11/1991 | Lailer, Jr. | ........... | F42B 10/06 244/3.24 |
| 5,096,143 A * | 3/1992 | Nash | ........... | B64C 5/10 244/46 |
| 5,853,312 A * | 12/1998 | Li | ........... | A63H 27/00 446/61 |

(Continued)

FOREIGN PATENT DOCUMENTS

| CA | 2771482 A1 * | 3/2011 | ........... B64C 5/02 |
|---|---|---|---|
| CA | 2945967 A1 * | 4/2018 | ........... B64C 25/54 |

(Continued)

OTHER PUBLICATIONS

U.S. Appl. No. 15/620,310, filed Jun. 12, 2017.
U.S. Appl. No. 15/620,317, filed Jun. 12, 2017.

*Primary Examiner* — Christopher P Ellis
(74) *Attorney, Agent, or Firm* — Winstead PC (57) ABSTRACT

An example of an aerial vehicle includes a rudder removably connected to the aerial vehicle by a twist lock mechanism. The twist lock mechanism is biased in a locked position by an elastic member.

13 Claims, 9 Drawing Sheets

(56) References Cited

U.S. PATENT DOCUMENTS

| | | | | |
|---|---|---|---|---|
| 6,315,240 B1 * | 11/2001 | Rasmussen | F42B 10/64 | 244/3.24 |
| 6,543,720 B2 * | 4/2003 | Ladd | B64C 9/00 | 244/45 R |
| 7,642,492 B2 * | 1/2010 | Parine | F42B 10/14 | 102/348 |
| 8,006,932 B2 * | 8/2011 | Honorato Ruiz | B64C 1/26 | 244/87 |
| 8,809,755 B1 * | 8/2014 | Patel | F42B 19/06 | 244/3.26 |
| 8,844,874 B2 * | 9/2014 | Pina Lopez | B64C 1/068 | 244/131 |
| 8,939,810 B1 * | 1/2015 | Suknanan | A63H 27/02 | 446/34 |
| 8,991,758 B2 * | 3/2015 | Earon | B64C 39/024 | 244/119 |
| 9,010,678 B1 * | 4/2015 | Hiller | B60F 5/02 | 244/2 |
| 10,196,143 B2 * | 2/2019 | Quinlan | B64C 39/024 | |
| 2003/0057325 A1 * | 3/2003 | Carroll | B64C 39/024 | 244/120 |
| 2005/0178883 A1 * | 8/2005 | Goodworth | B64C 1/06 | 244/17.11 |
| 2006/0091258 A1 * | 5/2006 | Chiu | A45C 13/02 | 244/119 |
| 2009/0159755 A1 * | 6/2009 | Gonzalez Gozalbo | B64C 9/02 | 244/215 |
| 2010/0044511 A1 * | 2/2010 | Coulter | B64C 3/185 | 244/123.1 |
| 2016/0039515 A1 * | 2/2016 | VanBuskirk | B64C 5/02 | 244/6 |
| 2018/0057136 A1 * | 3/2018 | Haley | B64C 39/024 | |
| 2018/0057145 A1 * | 3/2018 | Sartorius | B64C 11/28 | |
| 2018/0072398 A1 * | 3/2018 | Sartorius | B64C 1/26 | |
| 2018/0086458 A1 * | 3/2018 | Sartorius | B64C 1/26 | |
| 2018/0141659 A1 * | 5/2018 | Sher | B64C 1/16 | |
| 2018/0290743 A1 * | 10/2018 | Vorsin | B64C 39/024 | |
| 2019/0168872 A1 * | 6/2019 | Grubb | B64F 5/10 | |

FOREIGN PATENT DOCUMENTS

| | | | | |
|---|---|---|---|---|
| DE | 102005015338 A1 * | 10/2006 | | B64C 5/06 |
| FR | 3063785 A1 * | 9/2018 | | B64C 13/30 |
| GB | 1143177 A * | 2/1969 | | A63H 27/00 |

* cited by examiner

RUDDER TWIST LOCK METHOD AND APPARATUS

BACKGROUND

This section provides background information to facilitate a better understanding of the various aspects of the disclosure. It should be understood that the statements in this section of this document are to be read in this light, and not as admissions of prior art.

Some aircraft, such as, but not limited to, unmanned aerial vehicles (UAVs) comprise upper and lower rudder surfaces moving in tandem configured such that the upper rudder may be attached or detached from the lower rudder without disassembling the fuselage of the UAV.

SUMMARY

An example of a twist lock for connecting a tail surface in an aerial vehicle includes a cylindrical base supporting an elastic member, a cylindrical shaft including a channel, and a tang extending from the cylindrical base and biased by the elastic member to a locked position at an end of the channel.

An example of an aerial vehicle includes a rudder removably connected to an aerial vehicle by a twist lock, the twist lock biased in a locked position by an elastic member.

An example method of removably attaching a rudder to an aerial vehicle includes inserting a base attached to one of the aerial vehicle and the rudder into a hollow shaft attached to the other of the aerial vehicle and the rudder and a tang extending from one of the base and the hollow shaft into a channel formed in the other of base and the hollow shaft, and biasing the tang with an elastic member into a locked position in the channel thereby securing the hollow shaft and the base together.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
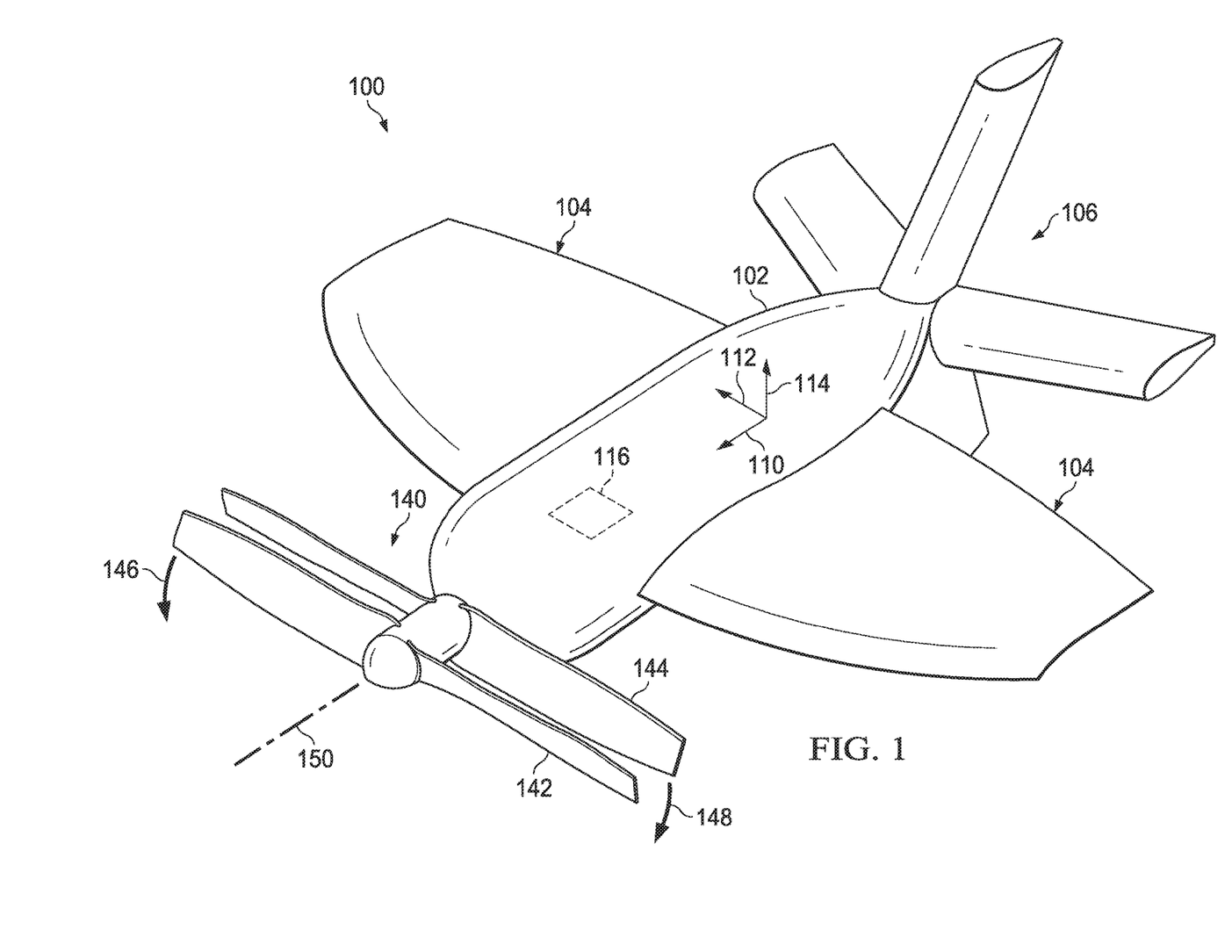
FIG. 1 is a perspective view of an unmanned aerial vehicle in an airplane mode of operation according to aspects of the disclosure.
Figure 2:
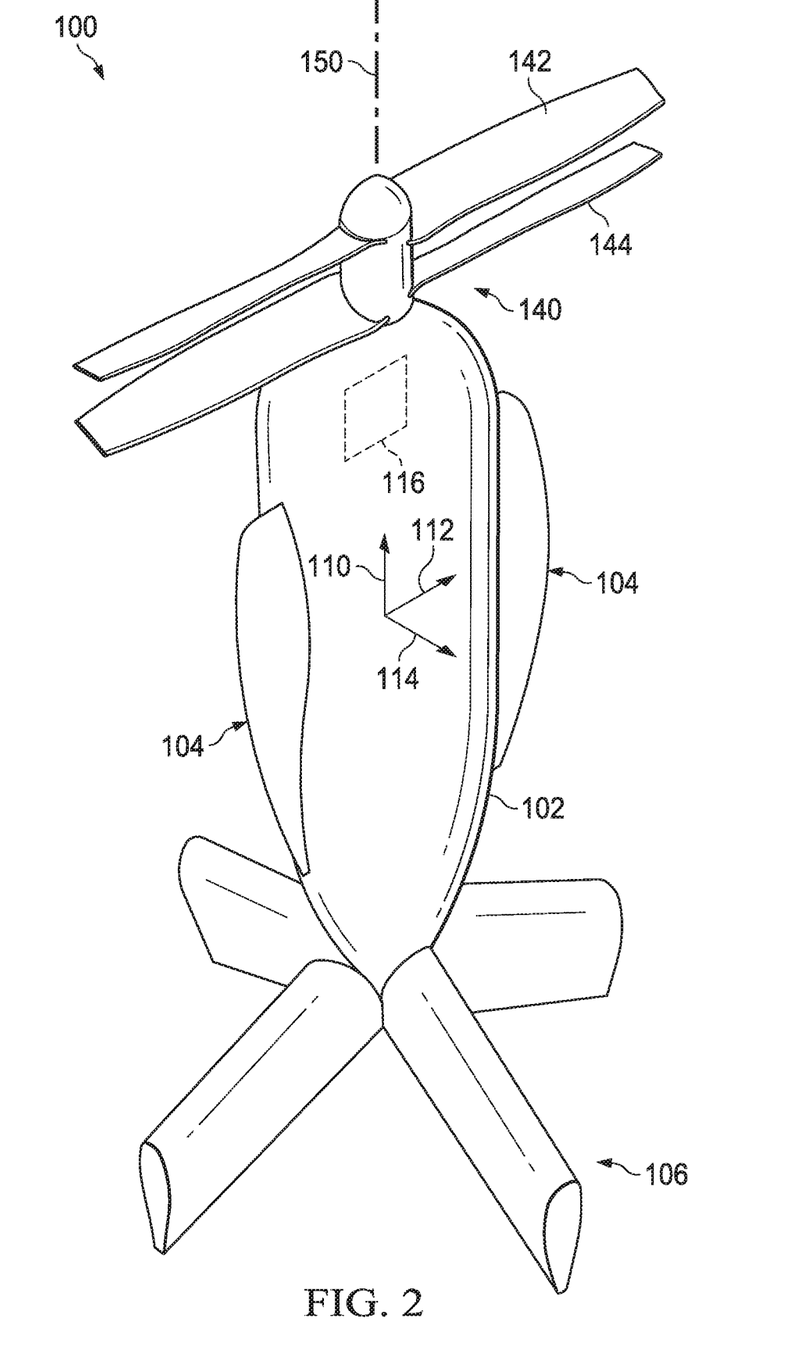
FIG. 2 is a perspective view of an unmanned aerial vehicle in a helicopter mode of operation according to aspects of the disclosure.

Referring to FIGS. 1 and 2, unmanned aerial vehicle (UAV) 100 is illustrated in an airplane mode of operation and a helicopter mode of operation. UAV 100 generally comprises fuselage 102, wings 104, tail surfaces 106, and rotor system 140. Wings 104 may be adjustable between a deployed position when UAV 100 is in airplane mode or a folded position when UAV 100 is in helicopter mode. Most generally, UAV 100 may be selectively operated in airplane mode, helicopter mode, and transition modes therebetween during which the UAV 100 may selectively switch between airplane mode and helicopter mode during flight. UAV 100 may selectively remain in a transition flight mode for a period of time longer than necessary to switch between airplane mode and helicopter mode.

Rotor system 140 includes independently driven blade assemblies 142, 144. Blade assembly 142 is driven about axis of rotation 150 in direction 146 and blade assembly 144 is driven in a counter rotation direction about axis of rotation 150 in direction 148. As such, the counter rotation of blade assemblies 142, 144 prevents wholesale rotation of UAV 100 without the use of a tail rotor or other anti-torque system and/or device. When the UAV 100 is in the helicopter mode of operation, changes in the relative speed of blade assembly 142 and blade assembly 144 may produce changes in yaw positioning of the UAV 100. However, when UAV 100 is in the airplane mode of operation, changes in the relative speed of blade assembly 142 and blade assembly 144 may produce changes in roll positioning of UAV 100.

UAV 100 may be referred to with a three-dimensional coordinate system comprising first axis 110 and second axis 112 orthogonal relative to first axis 110. Third axis 114 is normal to a plane shared by first axis 110 and second axis 112. First axis 110 extends generally along a length of UAV 100 and substantially parallel to a length of fuselage 102. Second axis 112 extends generally parallel to a length or span of wings 104. When UAV 100 is operating in the airplane mode, first axis 110 is generally associated with forward-rearward directionality, second axis 112 is generally associated with left-right directionality, and third axis 114 is generally associated with up-down directionality. However, because UAV 100 may operate in a variety of orientations, it is further helpful to understand that when UAV 100 is operating in the helicopter mode, first axis 110 is generally associated with up-down directionality while second axis 112 and third axis 114 are generally associated with lateral directions.

Figure 3:
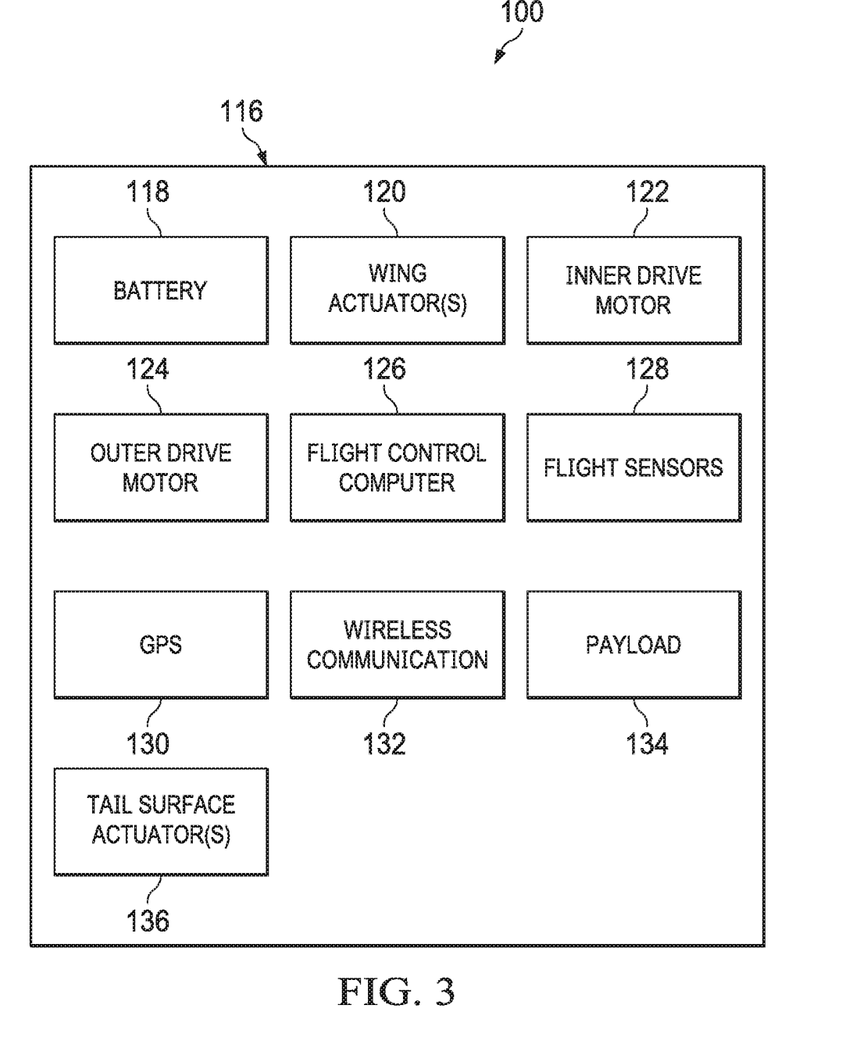
FIG. 3 is a schematic view of a power and control system according to aspects of the disclosure.

Referring to FIG. 3, UAV 100 further comprises power and control system (PCS) 116. PCS 116 comprises the components necessary to power and selectively control operation of UAV 100 as a whole. More specifically, PCS 116 comprises components configured to selectively power and control at least rotor system 140, wings 104, and tail surfaces 106. PCS 116 includes battery 118 for providing electrical energy to power one or more components of the UAV 100. PCS 116 includes wing actuator 120 configured to move wings 104. PCS 116 further includes inner drive motor 122 and outer drive motor 124. Inner drive motor 122 may be powered by battery 118 to selectively provide rotational power to one of the two independently driven blade assemblies of rotor system 140. The outer drive motor 124 may be powered by battery 118 to selectively provide rotational power to the other one of the two independently driven blade assemblies of rotor system 140. PCS 116 includes tail surface actuators 136 that are operatively mounted within fuselage 102 and are configured to selectively actuate tail surfaces 106.

PCS 116 includes flight control computer (FCC) 126 configured to manage the overall operation of UAV 100. FCC 126 is configured to receive inputs from flight sensors 128 such as, but not limited to, gyroscopes, accelerometers, and/or any other suitable sensing equipment configured to provide FCC 126 with spatial, positional, and/or force dynamics information, data, and/or feedback that may be utilized to manage the flight and/or operation of UAV 100. PCS 116 may include Global Positioning System (GPS) components 130 configured to determine, receive, and/or provide data related to the location of UAV 100 and/or flight destinations, targets, no-fly zones, preplanned routes, flight paths, and/or any other geospatial location related information. GPS components 130 may be configured for bidirectional communication with FCC 126, unidirectional communication with the FCC 126 being configured to receive information from GPS components 130, or unidirectional communication with FCC 126 being configured to provide information to GPS components 130.

PCS 116 may include wireless communication components 132, such as, but not limited to, radio communication equipment configured to send and/or receive signals related to flight commands and/or other operational information. Wireless communication components 132 may be configured to transmit video, audio, and/or other data gathered, observed, and/or information otherwise generated, carried by, and/or obtained by UAV 100. Payload 134 of PCS 116 may include a video camera, thermal camera, infrared imaging device, chemical sensor configured to determine a presence and/or concentration of a chemical, a weapon, and/or any other suitable payload. Payload 134 may be configured to provide information or data to FCC 126 and FCC 126 may be configured to control and/or manipulate payload 134. Each of the components of PCS 116 that require electrical energy to operate may be powered by battery 118. Alternatively, battery 118 may be replaced and/or supplemented with other sources of electricity, such as, but not limited to, capacitors, photovoltaic solar cells, fuel cells, and/or any other system or component configurable to provide electrical energy to components of UAV 100.

Figure 4:
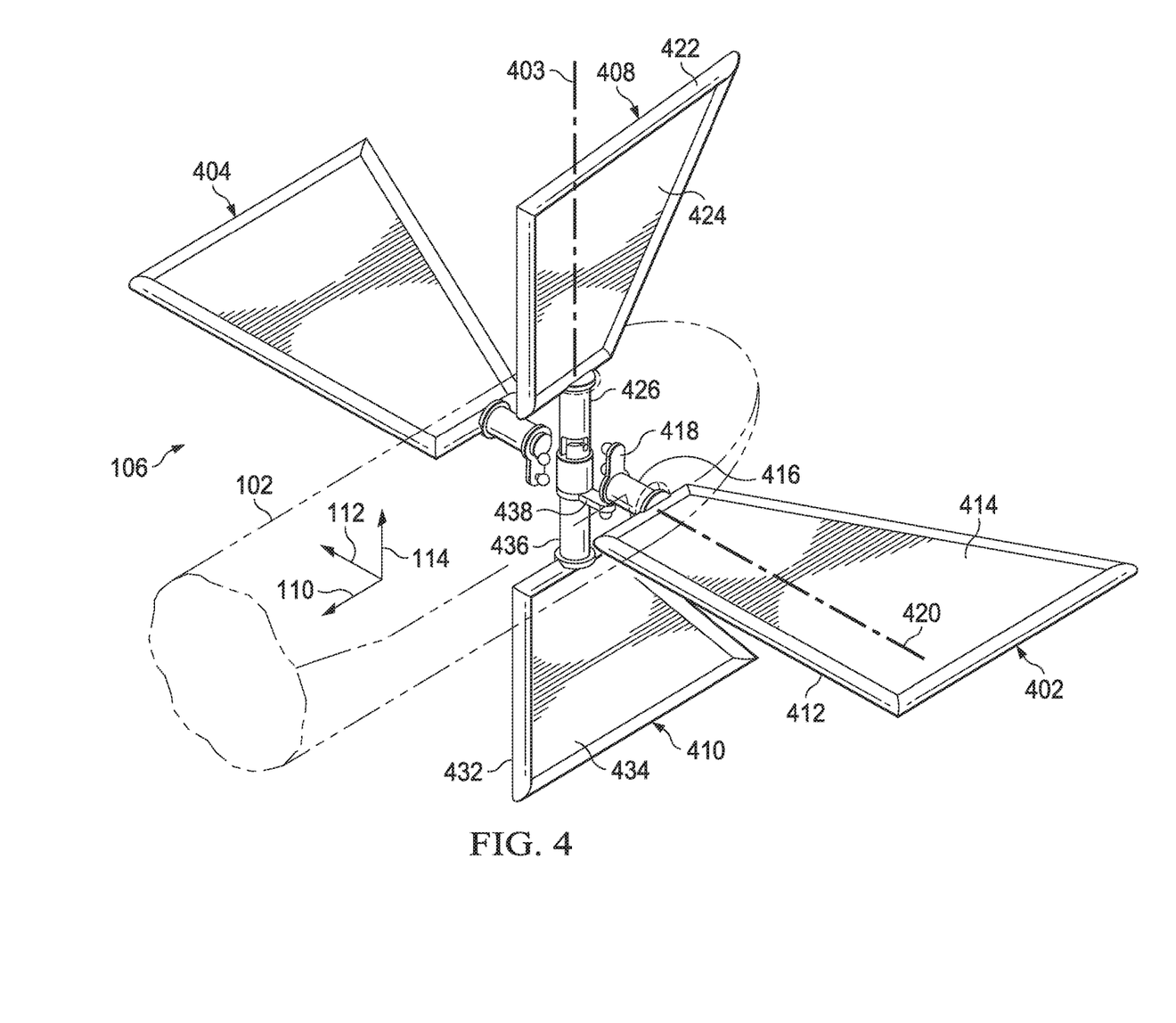
FIG. 4 is a partial perspective view of an upper rudder attached to a lower rudder according to one or more aspects of the disclosure.
Figure 5:
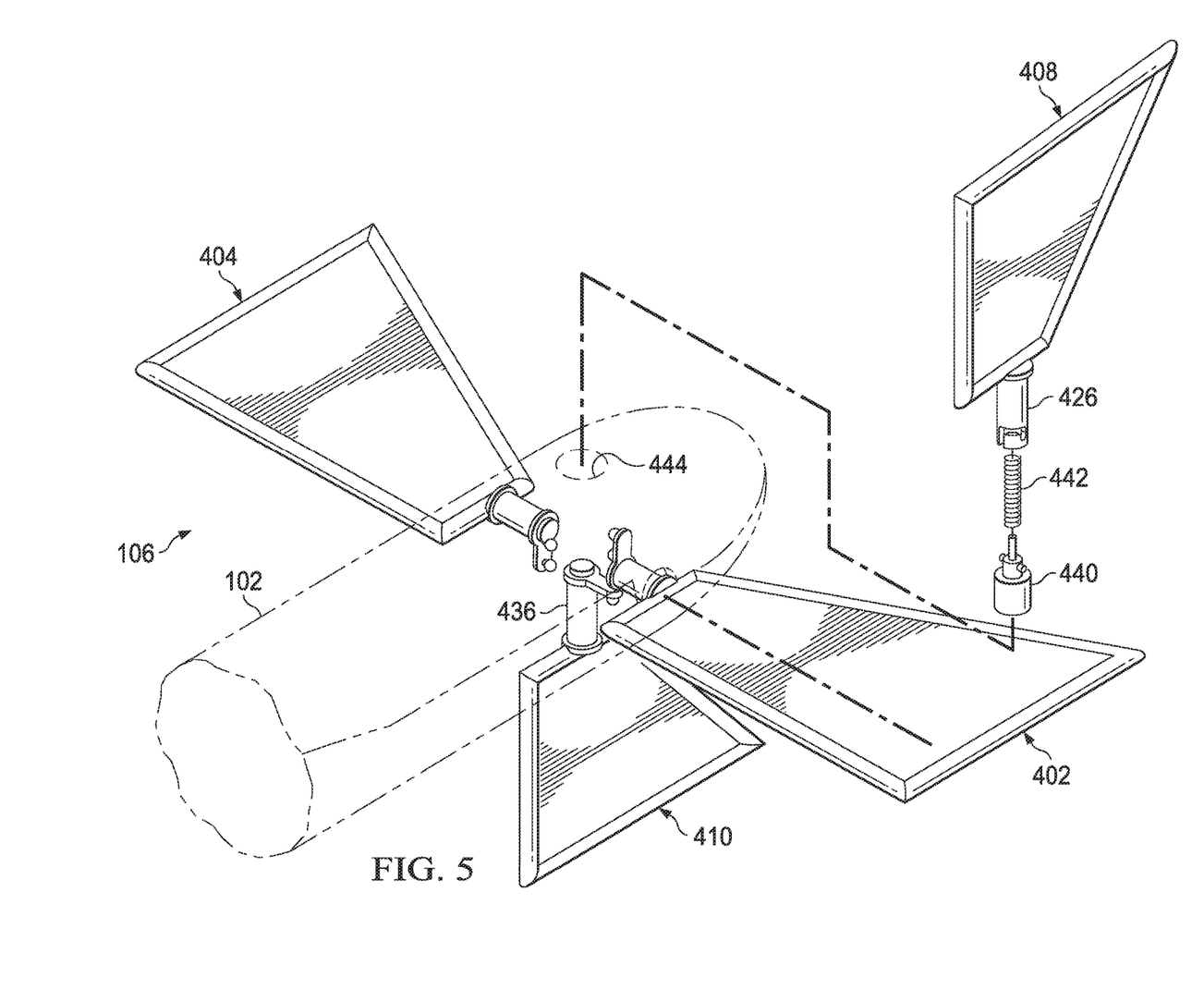
FIG. 5 is a partial, exploded perspective view of an upper rudder detached from a lower rudder according to one or more aspects of the disclosure.

Referring to FIGS. 4 and 5, tail surfaces 106 include taileron 402, taileron 404, rudder 408, and rudder 410. Tailerons 402, 404 are flight control surfaces that combine the functionality of ailerons and tail sections of a typical fixed wing aircraft. Tailerons 402, 404 are used to control the aircraft in movement around the aircraft's longitudinal axis and control pitch of the aircraft in movement around the aircraft's lateral axis, which normally results in a change in flight path due to the tilting of the lift vector. Movement around the aircraft's longitudinal axis is called rolling or banking. Rudders 408, 410 are used primarily to counter adverse yaw and are not the primary control used to turn the airplane. A rudder operates by redirecting airflow that passes over the control surface, thus imparting a turning or yawing motion to the aircraft.

Each taileron 402, 404 includes frame 412, skin 414, shaft 416, and flange 418. In the interest of clarity, taileron 402 is described herein with the understanding taileron 404 is similarly configured. Skin 414 envelops frame 412 to create a tail surface that directs airflow. Shaft 416 extends from frame 412. Flange 418 extends from shaft 416. Flange 418 is connected to tail surface actuators 136. Shaft 416 has central longitudinal axis 420. Taileron 402 and taileron 404 extend generally horizontally from fuselage 102 in a direction generally parallel with second axis 112. When acted on by tail surface actuators 136, each taileron may pitch or rotate about central longitudinal axis 420 relative to fuselage 102. Tailerons 402, 404 may rotate about their respective longitudinal axes independently from each other.

Rudder 408 includes frame 422 and skin 424. Rudder 410 includes frame 432 and skin 434. Skins 424, 434 wrapped around frames 422, 432, respectively, create tail surfaces that affect airflow. Shaft 426 extends from frame 422. Shaft 436 extends from frame 432. Flange 438 is connected to shaft 436. Flange 438 is connected to tail surface actuators 136. Shaft 426 and shaft 436 are concentrically aligned and share central longitudinal axis 403. Rudder 408 and rudder 410 extend generally vertically from fuselage 102 in a direction generally parallel with third axis 114. Shaft 426 passes through hole 444 in fuselage 102. Shaft 426 is removably connected to base 440. Base 440 is mounted to shaft 436. Rudder 408 and rudder 410 are connected to a single tail surface actuator 136 via shafts 426, 436 and flange 438. Rudder 408 and rudder 410 move in unison when flange 438 is acted on by a tail surface actuator.

Figure 6:
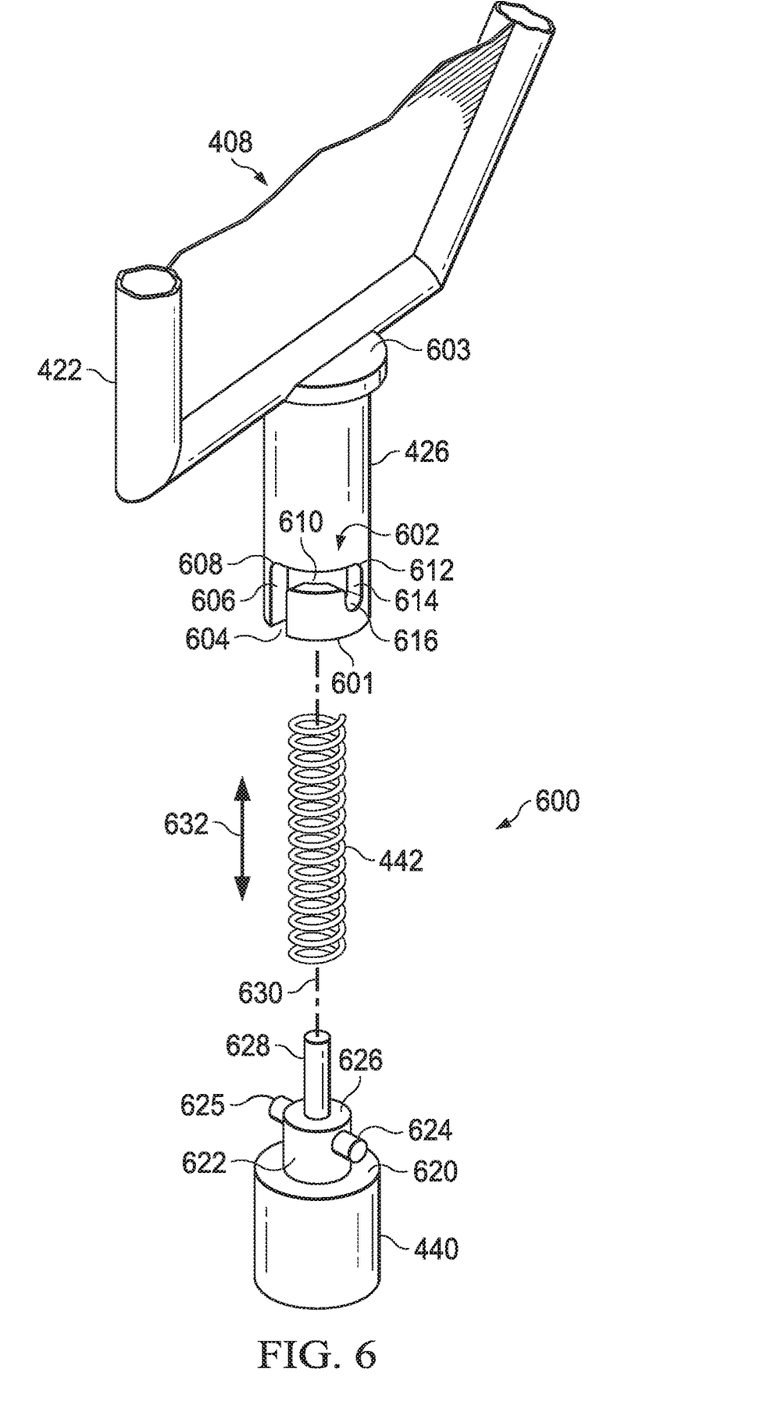
FIG. 6 is an exploded perspective view of a twist lock mechanism according to one or more aspects of the disclosure.

Referring to FIG. 6, rudder 408 is removably connected to rudder 410 with twist lock mechanism 600. Twist lock mechanism 600 includes shaft 426 of rudder 408, base 440, and spring 442.

Shaft 426 is a hollow cylinder including open end 601 opposite closed end 603. Frame 422 is mounted to closed end 603. Channel 602 is formed in the side surface of shaft 426. Channel 602 includes mouth 604 beginning at open end 601. Mouth 604 leads to vertical channel 606. Vertical channel terminates at corner 608. Horizontal channel 610 extends from corner 608 to corner 612. Lock channel 614 extends from corner 612 to end 616. Lock channel 614 is generally vertically oriented. In the interest of clarity, channel 602 is described herein with the understanding a similarly configured channel to channel 602 may formed in an opposite side surface of shaft 426.

Base 440 is mounted to shaft 436 of rudder 410. Flange 438 is connected to base 440 and/or shaft 436. Base 440 is a cylinder including surface 620. Stanchion 622 extends from surface 620 and is sized to engage the interior of shaft 426. Stanchion 622 fitted within the interior of shaft 426 concentrically aligns shaft 426 with base 440. Tangs 624, 625 extend horizontally from stanchion 622. Tangs 624, 625 are sized to engage channel 602. In the event shaft 426 includes only a single channel 602, only a single tang 624 or 625 is present. Alternatively, tangs 624, 625 may extend from shaft 426 and channel 602 may be formed in base 440. Stanchion 622 is a cylinder including surface 626. Post 628 extends from surface 626. Post 628 includes central longitudinal axis 630. Stanchion 622 and post 628 are concentrically aligned around central longitudinal axis 630. Post 628 supports spring 442. Spring 442 biases shaft 426 away from base 440 in direction 632 generally parallel with central longitudinal axis 630. Spring 442 may be a coil spring. Alternatively, spring 442 may be any elastic member capable of opposing compressive forces. Spring 442 abuts surface 626 and closed end 603.

Figure 7:
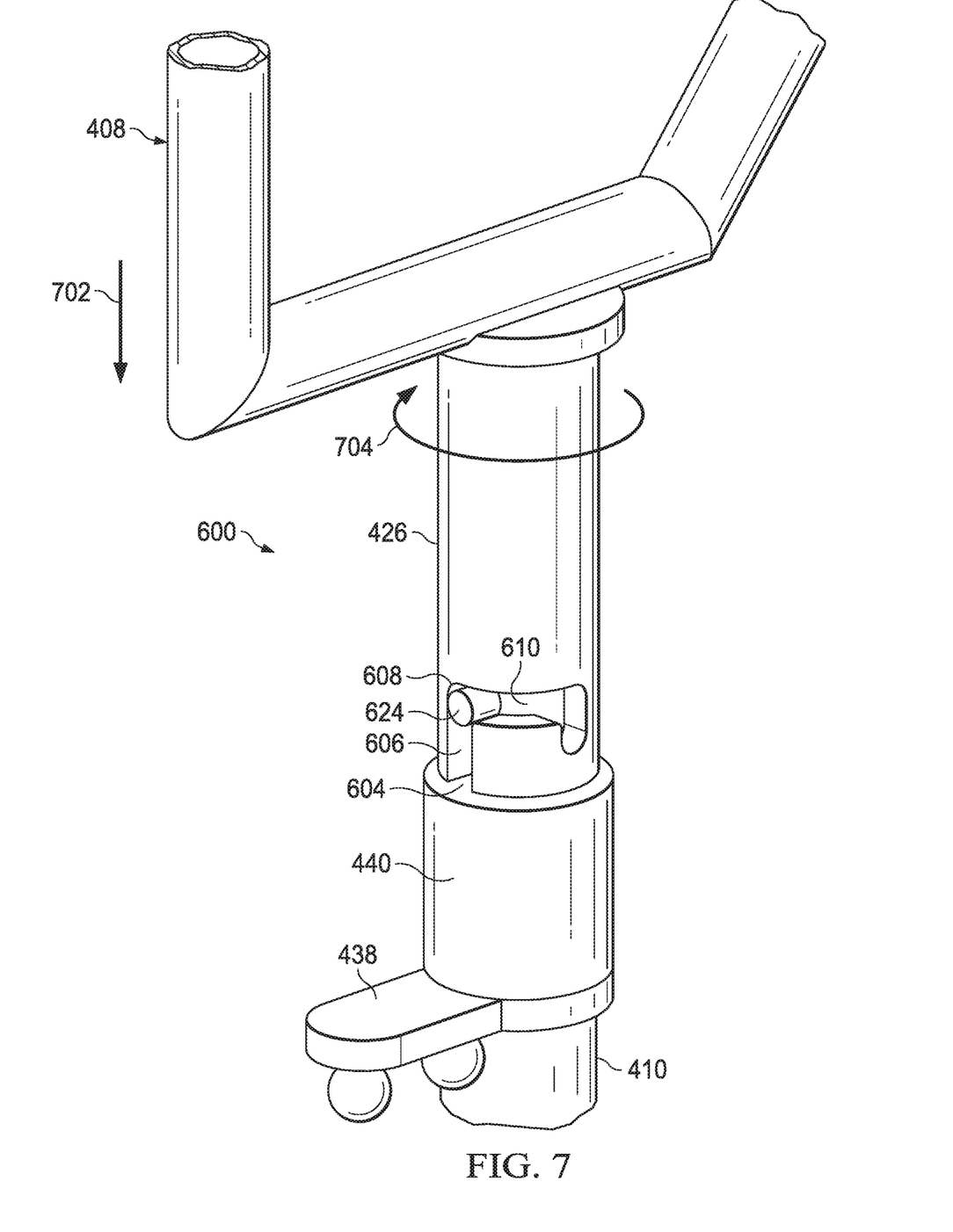
FIG. 7 is a perspective view of a twist lock mechanism in operation according to one or more aspects of the disclosure.
Figure 8:
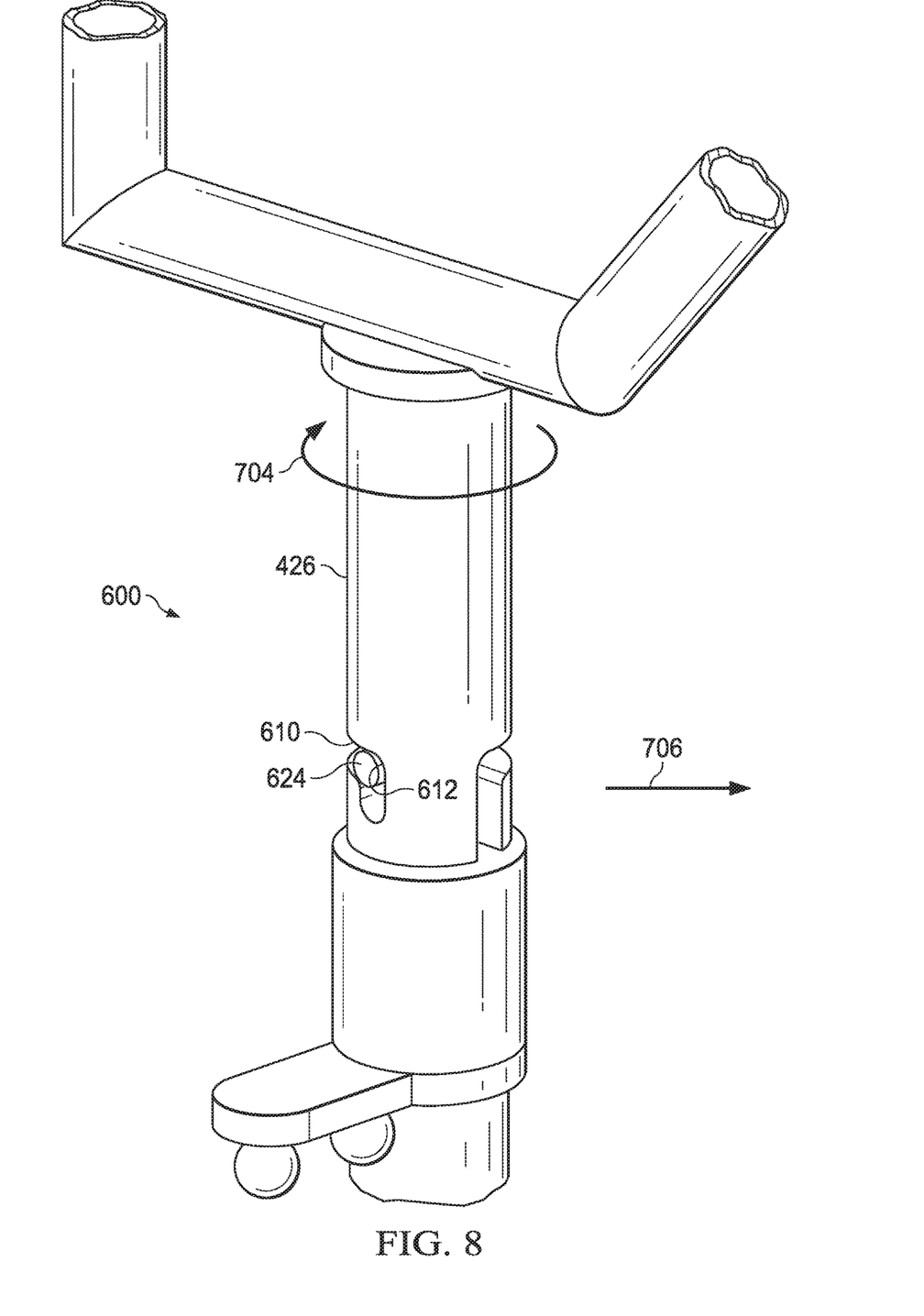
FIG. 8 is a perspective view of a twist lock mechanism in operation according to one or more aspects of the disclosure.
Figure 9:
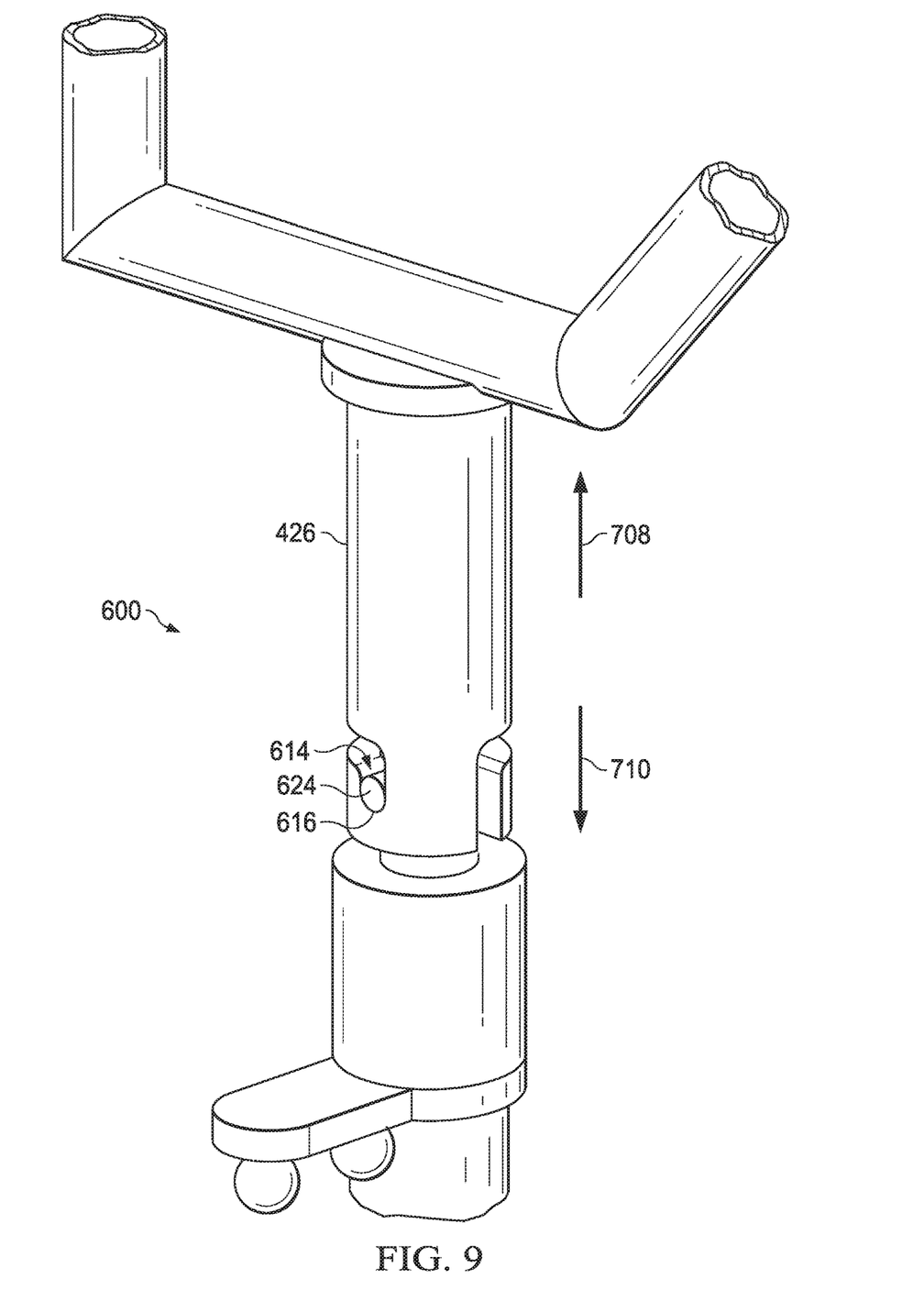
FIG. 9 is a perspective view of a twist lock mechanism in operation according to one or more aspects of the disclosure.

As illustrated in FIGS. 7-9, twist lock mechanism 600 is used to removably secure rudder 408 to rudder 410 without disassembling fuselage 102. To install rudder 408 to rudder 410, shaft 426 passes through hole 444. Post 628 and spring 442 enter open end 601. Tang 624 enters channel 602 at mouth 604. Downward pressure on shaft 426 in direction 702 compresses spring 442 between closed end 603 and surface 626 as tang 624 moves through vertical channel 606. Stanchion 622 centers shaft 426 on base 440. As shown in FIG. 7, downward movement of shaft 426 in direction 702 ceases as tang 624 reaches corner 608.

Rotational movement of shaft 426 in direction 704 moves tang 624 through horizontal channel 610 in direction 706. As shown in FIG. 8, rotational movement of shaft 426 in direction 704 and movement of tang 624 through horizontal channel 610 in direction 706 ceases when tang 624 reaches corner 612.

Release of downward pressure on shaft 426 in direction 702 causes spring 442 to expand and moves shaft in direction 708 and moves tang 624 through lock channel 614 in direction 710. As shown in FIG. 9, movement of shaft 426 in direction 708 and movement of tang 624 in direction 710 through lock channel 614 ceases when tang 624 reaches end 616.

In order to remove rudder 408 from attachment to rudder 410, the attachment process is repeated in reverse. It is understood that when tang 625 is present, tang 625 moves similarly through a similar channel formed in an opposite side of shaft 426 during the attachment and release of rudder 408 to and from rudder 410.

In operation, UAV 100 may be initially stored in a small box, backpack, or sack with rudder 408 unattached to rudder 410. Once UAV 100 is removed from storage, twist lock mechanism 600 may be used to removably attach rudder 408 to rudder 410 and a desired configuration of initial operation can be selected, namely, airplane mode or helicopter mode. In some cases, a mode of operation in between airplane mode and helicopter mode may be selected as an initial operation. In cases where an initial mode of operation in helicopter mode is desired, PCS 116 may control acceleration of rotor system 140 and UAV 100 may take flight substantially vertically. After taking off in helicopter mode, FCC 126 of PCS 116 may cause actuation of wing actuator 120 to deploy wings 104. With wings 104 deployed, FCC 126 may control rotor system 140 to pull UAV 100 into the airplane mode from the helicopter mode. In some cases, UAV 100 may be launched from a first location in the helicopter mode, convert midair to the airplane mode, fly to a new location (in some cases at least partially guided by GPS coordinates interpreted by GPS components 130), and subsequently reconvert to helicopter mode at the new location.

While at the new location, UAV 100 may utilize onboard equipment, such as, but not limited to, payload 134 cameras to conduct surveillance and record and/or transmit information regarding the surveillance using wireless communication components 132. After conducting the surveillance or otherwise completing a mission at the new location, UAV 100 may once again convert to airplane mode and selectively return to the site of the launch and/or any other desired location within the range of UAV 100. Alternatively, UAV 100 may be launched in airplane mode and may selectively switch between modes of operation as desired or necessary.

In some cases, an example of a necessary switch from airplane mode to helicopter mode may be in response to flight sensors 128 providing feedback to FCC 126 regarding gusts of wind, heavy rainfall, and/or other environmental flight encumbrances that are determined to prevent successful, safe, and/or efficient flight between locations. In response to undesirable flight conditions, the UAV 100 may convert to helicopter mode and automatically land itself upright on tail surfaces 106. Once the FCC 126 determines sufficiently favorable flying conditions, the UAV 100 may launch itself using helicopter mode and again convert to airplane mode to continue travelling to a desired location.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, as understood by a person of ordinary skill in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A twist lock for connecting a tail surface in an aerial vehicle, comprising:
    a cylindrical base supporting an elastic member;
    a cylindrical shaft including a channel; and
    a tang extending from the cylindrical base and biased by the elastic member to a locked position at an end of the channel.

2. The twist lock of claim 1, wherein the channel comprises:
   a first leg extending in a first direction from a mouth to a first corner;
   a second leg extending in a second direction from the first corner to a second corner; and
   a lock channel extending in a third direction from the second corner to the end.

3. The twist lock of claim 1, wherein the cylindrical shaft further comprises an open end engaged with the cylindrical base and a closed end engaged with the elastic member.

4. The twist lock of claim 1, wherein the cylindrical base further comprises:
   a stanchion, extending from the cylindrical base, concentrically aligned and engaged with the cylindrical shaft;
   a post extending from the stanchion;
   the post engages the elastic member; and
   the tang engages the channel.

5. The twist lock of claim 1, wherein the cylindrical base further comprises:
   a stanchion concentrically aligned and engaged with the cylindrical shaft;
   the tang extends from the stanchion to engage the channel; and
   the elastic member abuts the stanchion and the cylindrical shaft.

6. The twist lock of claim 1, wherein the cylindrical base further comprises:
   a stanchion concentrically aligned and engaged with the cylindrical shaft;
   a post extending from the stanchion and concentrically aligned with the stanchion; and
   the post engages the elastic member.

7. The twist lock of claim 1, wherein the elastic member is a coil spring.

8. The twist lock of claim 1, wherein the elastic member abuts the cylindrical base and the cylindrical shaft.

9. The twist lock of claim 1, wherein:
   the cylindrical shaft further comprises an open end engaged with the cylindrical base and a closed end in contact with the elastic member;
   the channel further comprises a mouth at the open end leading to a vertical channel;
   the vertical channel terminating in a first corner;
   a horizontal channel extending from the first corner to a second corner; and
   a lock channel extending from the second corner to the end.

10. A method of removably attaching a rudder to an aerial vehicle, comprising:
    inserting a base attached to one of the aerial vehicle and the rudder into a hollow shaft attached to the other of the aerial vehicle and the rudder and a tang extending from one of the base and the hollow shaft into a channel formed in the other of base and the hollow shaft; and
    biasing the tang with an elastic member into a locked position in the channel thereby securing the hollow shaft and the base together.

11. The method of claim 10, comprising rotating one of the hollow shaft and the base relative to the other of the hollow shaft and the base around a central longitudinal axis shared by the hollow shaft and the base.

12. The method of claim 10, comprising moving the tang through a first leg of the channel in a first direction, moving the tang through a second leg of the channel in a second direction, and moving the tang through a lock leg of the channel in a third direction to an end of the channel.

13. The method of claim 10, wherein the elastic member abuts a closed end of the hollow shaft and a stanchion extending from the base.

\* \* \* \* \*